United States Patent
Kuwayama et al.

(10) Patent No.: US 9,573,652 B2
(45) Date of Patent: Feb. 21, 2017

(54) BICYCLE DERAILLEUR

(71) Applicant: Shimano Inc., Sakai, Osaka (JP)

(72) Inventors: Kazuya Kuwayama, Osaka (JP);
Etsuyoshi Watarai, Osaka (JP);
Atsuhiro Emura, Osaka (JP)

(73) Assignee: Shimano Inc., Osaka (JP)

( * ) Notice: Subject to any disclaimer, the term of this patent is extended or adjusted under 35 U.S.C. 154(b) by 46 days.

(21) Appl. No.: 14/246,815

(22) Filed: Apr. 7, 2014

(65) Prior Publication Data
US 2014/0323254 A1    Oct. 30, 2014

(30) Foreign Application Priority Data

Apr. 25, 2013  (JP) .................................. 2013-092180

(51) Int. Cl.
| | |
|---|---|
| *F16H 9/00* | (2006.01) |
| *F16H 59/00* | (2006.01) |
| *F16H 61/00* | (2006.01) |
| *F16H 63/00* | (2006.01) |
| *B62M 9/12* | (2006.01) |
| *B62M 9/122* | (2010.01) |

(52) U.S. Cl.
CPC ............... *B62M 9/12* (2013.01); *B62M 9/122* (2013.01)

(58) Field of Classification Search
CPC ....... B62M 25/08; B62M 9/132; B62M 9/122; B62M 9/1244; F16H 63/30
USPC ..................................................... 474/80, 82
See application file for complete search history.

(56) References Cited

U.S. PATENT DOCUMENTS

| | | | | |
|---|---|---|---|---|
| 3,181,383 | A * | 5/1965 | Hippolyte ........................ | 474/82 |
| 4,078,444 | A * | 3/1978 | Huret ................................ | 474/82 |
| 5,254,044 | A * | 10/1993 | Anderson ........................ | 474/70 |
| 6,648,782 | B2 * | 11/2003 | Valle ................................ | 474/78 |
| 6,679,797 | B2 * | 1/2004 | Valle ................................ | 474/80 |
| 6,979,009 | B2 * | 12/2005 | Ichida et al. .................... | 280/238 |
| 7,004,862 | B2 * | 2/2006 | Fukuda ............................ | 474/102 |
| 7,255,660 | B2 * | 8/2007 | Del Pra ............................ | 474/82 |
| 7,291,079 | B2 * | 11/2007 | Ichida et al. .................... | 474/80 |
| 7,306,531 | B2 * | 12/2007 | Ichida et al. .................... | 474/70 |
| 7,331,890 | B2 * | 2/2008 | Ichida et al. .................... | 474/80 |
| 7,341,532 | B2 * | 3/2008 | Ichida et al. .................... | 474/70 |
| 7,381,142 | B2 * | 6/2008 | Campagnolo .................... | 474/70 |
| 7,442,136 | B2 * | 10/2008 | Ichida et al. .................... | 474/82 |
| 7,467,567 | B2 * | 12/2008 | Fukuda ............................ | 74/412 R |
| 7,503,863 | B2 * | 3/2009 | Ichida et al. .................... | 474/80 |
| 7,704,173 | B2 * | 4/2010 | Ichida et al. .................... | 474/82 |
| 8,002,655 | B2 * | 8/2011 | Meggiolan ...................... | 474/82 |
| 8,033,937 | B2 * | 10/2011 | Meggiolan ...................... | 474/70 |
| 8,066,597 | B2 * | 11/2011 | Sakaue ............................ | 474/82 |
| RE43,562 | E  * | 7/2012 | Takeda et al. .................. | 474/78 |
| 8,241,158 | B2 * | 8/2012 | Ishikawa ........................ | 474/80 |

(Continued)

*Primary Examiner* — Henry Liu
(74) *Attorney, Agent, or Firm* — Global IP Counselors (57) ABSTRACT

A bicycle derailleur includes a fixing member, a selected chain guide unit and a motor unit. The fixing member is configured to be fixed to a bicycle frame. The selected chain guide unit has a chain guide for guiding a bicycle chain and a support mechanism moveably supporting the chain guide relative to the fixing member. The selected chain guide unit is one of a plurality of different configurations of chain guide units. The motor unit is configured to be selectively attached to the selected chain guide unit to move the chain guide. The motor unit is configured to be mounted to each of the plurality of configurations of chain guide units.

7 Claims, 9 Drawing Sheets

(56) References Cited

U.S. PATENT DOCUMENTS

| | | | |
|---|---|---|---|
| 8,282,519 B2* | 10/2012 | Ichida et al. | 474/82 |
| 8,979,683 B2* | 3/2015 | Katsura et al. | 474/80 |
| 2002/0061797 A1* | 5/2002 | Valle | 474/70 |
| 2003/0027674 A1* | 2/2003 | Valle | 474/70 |
| 2004/0014541 A1* | 1/2004 | Dal Pra | 474/70 |
| 2004/0063528 A1* | 4/2004 | Campagnolo | 474/70 |
| 2004/0102268 A1* | 5/2004 | Valle | 474/80 |
| 2005/0189158 A1* | 9/2005 | Ichida | B62M 25/08 180/260 |
| 2005/0192137 A1* | 9/2005 | Ichida et al. | 474/70 |
| 2005/0192139 A1* | 9/2005 | Ichida et al. | 474/80 |
| 2005/0192140 A1* | 9/2005 | Meggiolan | 474/80 |
| 2005/0197222 A1* | 9/2005 | Tatsumi | 474/80 |
| 2005/0205323 A1* | 9/2005 | Ichida et al. | 180/205 |
| 2005/0239587 A1* | 10/2005 | Ichida et al. | 474/82 |
| 2005/0266945 A1* | 12/2005 | Meggiolan | 474/70 |
| 2005/0272541 A1* | 12/2005 | Valle et al. | 474/80 |
| 2006/0189421 A1* | 8/2006 | Ichida et al. | 474/80 |
| 2006/0189422 A1* | 8/2006 | Ichida et al. | 474/80 |
| 2007/0037645 A1* | 2/2007 | Ishikawa | 474/80 |
| 2007/0184925 A1* | 8/2007 | Ichida et al. | 474/80 |
| 2008/0132364 A1* | 6/2008 | Ichida et al. | 474/70 |
| 2014/0114538 A1* | 4/2014 | Shipman et al. | 701/51 |
| 2014/0121047 A1* | 5/2014 | Katsura et al. | 474/80 |
| 2014/0128189 A1* | 5/2014 | Kuwayama et al. | 474/82 |
| 2014/0128190 A1* | 5/2014 | Emura et al. | 474/82 |
| 2014/0148287 A1* | 5/2014 | Tachibana et al. | 474/82 |
| 2014/0155205 A1* | 6/2014 | Kuwayama et al. | 474/80 |
| 2014/0323254 A1* | 10/2014 | Kuwayama et al. | 474/80 |

* cited by examiner

BICYCLE DERAILLEUR

CROSS-REFERENCE TO RELATED APPLICATIONS

This application claims priority under 35 U.S.C. §119 to Japanese Patent Application No. 2013-092180, filed Apr. 25, 2013. The entire disclosure of Japanese Patent Application No. 2013-092180 is hereby incorporated herein by reference.

BACKGROUND

Field of the Invention

This invention generally relates to a bicycle derailleur. More specifically, the present invention relates to an electric derailleur.

Background Information

Typically, various types of front derailleurs are known which correspond to bicycle frames of various shapes. Recently, electric front derailleurs (see Japanese Laid-Open Patent Publication No. 2005-239136, for example) have become popular.

SUMMARY

Because an electric front derailleur includes an expensive unit such as a motor unit, costs are high to individually prepare electric derailleurs of various types or configurations.

One object of the present invention is to provide various types or configurations of electric derailleurs at low cost.

(1) A bicycle derailleur according to an aspect of the present invention comprises a fixing member, a selected chain guide unit and a motor unit. The fixing member is configured to be fixed to a bicycle frame. The selected chain guide unit has a chain guide for guiding a bicycle chain and a support mechanism moveably supporting the chain guide relative to the fixing member. The selected chain guide unit is one of a plurality of different configurations of chain guide units. The motor unit is configured to be selectively attached to the selected chain guide unit to move the chain guide. The motor unit is configured to be mounted to each of the plurality of configurations of chain guide units.

In a derailleur according to another aspect of the present invention described above, the selected chain guide unit and the motor unit are separate units. The motor unit can be attached to each of the plurality of configurations of chain guide units. Therefore, the motor unit does not need to be replaced even when the chain guide unit selected from the plurality of configurations of chain guide units is replaced by another configuration or type of chain guide unit. Specifically, the motor unit can be shared among different configurations of chain guide units. As a result, various types or configurations of electric derailleurs can be provided at low cost merely by replacing the selected chain guide unit.

(2) Preferably, the motor unit is connected to the support mechanism of the selected chain guide unit. This configuration can be made simpler than in cases in which the motor unit and the chain guide are directly connected, by driving a link mechanism or another support mechanism, for example, through the motor unit.

(3) Preferably, the fixing member is included in the selected chain guide unit and connected to the support mechanism. With this configuration, the fixing member can be replaced along with the chain guide unit.

(4) Preferably, the support mechanism of the selected chain guide unit includes at least one link member linked to the fixing member to pivot about a first shaft and linked to the chain guide to pivot about a second shaft. With this configuration, the chain guide can be moveably supported in a simple manner by the link member.

(5) The at least one link member includes a first link member and a second link member capable of pivoting about the first shaft and the second shaft, respectively. With this configuration, the chain guide unit can be supported in a more stable manner.

(6) The second shaft is disposed lower than the first shaft while the derailleur is attached to the bicycle frame in an installed state.

(7) the second shaft is disposed higher than the first shaft while the derailleur is attached to the bicycle frame in an installed state.

(8) The fixing member can be configured as including an annular band part for tightening the frame.

(9) The fixing member can be configured as having a through-hole for receiving a bolt therethrough to fix the fixing member to the bicycle frame.

(10) Preferably, the through-hole is an elongated hole.

(11) The fixing member can be configured as including a plate part that configured to be fixed to a bottom bracket of the bicycle frame.

(12) The fixing member can be configured as having a screw hole for threadedly engaging a bolt that extends through a through-hole in fixed part of the bicycle frame.

(13) The configuration can be designed such that the motor unit includes an output shaft, and the output shaft has an orientation while the derailleur is attached to the bicycle frame in an installed state that is different between cases of the motor unit being attached to the selected chain guide unit and cases of the motor unit being attached to other ones of the plurality of configurations of chain guide units.

According to the present invention, various types or configurations of electric derailleurs can be provided at low cost.

Also other objects, features, aspects and advantages of the disclosed bicycle control device will become apparent to those skilled in the art from the following detailed description, which, taken in conjunction with the annexed drawings, discloses one embodiment of the bicycle control device.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
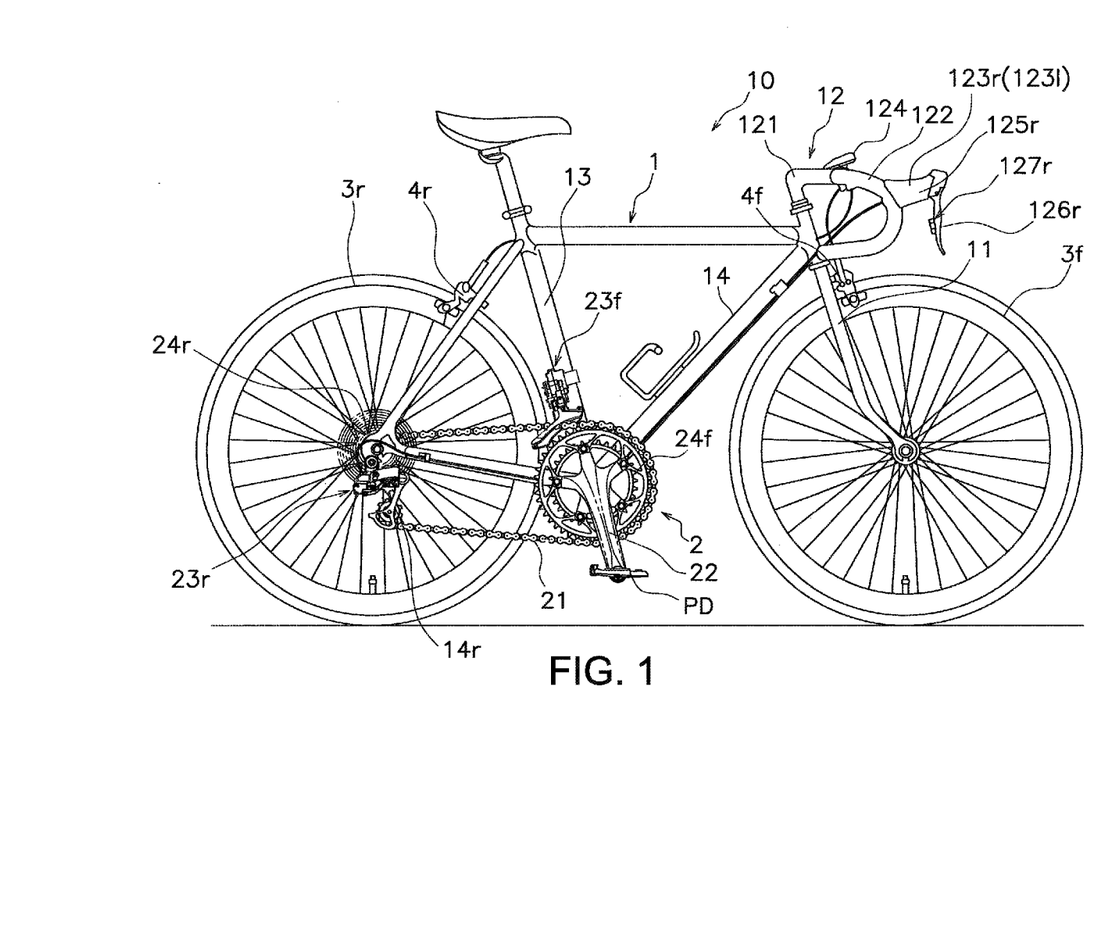
FIG. 1 is a side elevational view of a bicycle on which a front derailleur is mounted.

An embodiment of a front derailleur as an example of the bicycle derailleur according to the present invention is described below with reference to the drawings. FIG. 1 is a side view showing a bicycle 10 on which a front derailleur 23f according to the present invention is mounted.

The bicycle 10 comprises a frame 1, a drive part 2, a front wheel and rear wheel 3f, 3r, a front brake device 4f, and a rear brake device 4r, as shown in FIG. 1. The frame 1 is a diamond frame, having a front fork 11, a handle part 12, a seat tube 13, and a down tube 14.

The handle part 12 has a handle stem 121 and a handlebar 122. The handle stem 121 is fitted with and fixed to the top part of the front fork 11. The handlebar 122 is a drop handle, comprising a pair of left and right operating devices 123r, 123l. Provided in the center of the handlebar 122 is a display device 124 for displaying the bicycle speed, distance traveled, and shift position. Of the pair of left and right operating devices 123r, 123l, FIG. 1 shows only the right operating device 123r. Other than being mirror images of each other, the operating devices 123r, 123l are configured identically, and therefore only the operating device 123r is described below.

The operating device 123r has a bracket 125r and a lever member 126r. The bracket 125r is mounted to the handlebar 122. The lever member 126r is pivotally mounted to the bracket 125r. The rear surface of the lever member 126r is provided with a shifting operation part 127r for operating the front derailleur 23f, described hereinafter. In the left operating device 123l, a shifting operation part for operating a rear derailleur 23r, described hereinafter, is provided to the lever member in the same manner as the operating device 123r.

Figure 8:
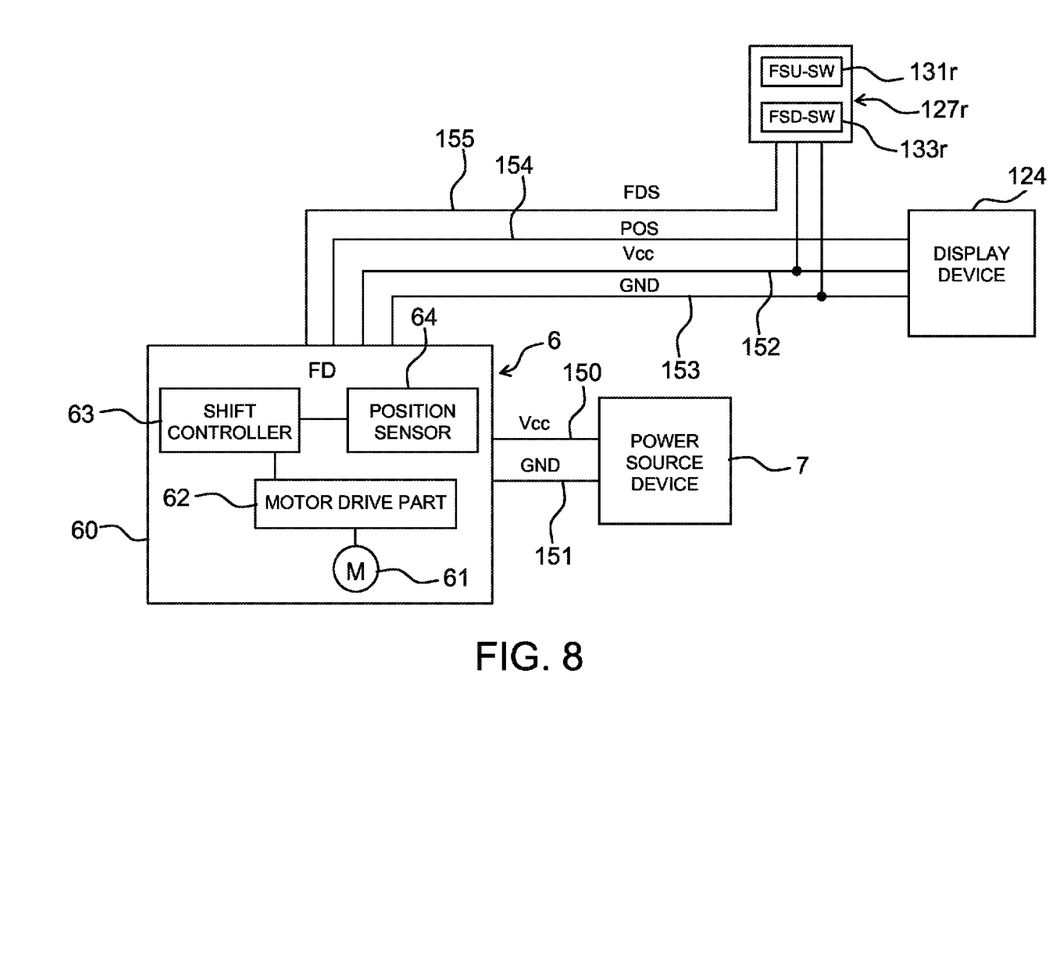
FIG. 8 is a block diagram of a front derailleur and the instruments connected thereto.

The shifting operation part 127r is provided with a front upshift switch (FSU-SW) 131r and a front downshift switch (FSD-SW) 133r (see FIG. 8). The shifting operation part of the left operating device 123l is similarly provided with a rear upshift switch and a rear downshift switch.

The drive part 2 has a chain 21, a crank 22 to which a pedal PD is mounted, the front derailleur 23f, the rear derailleur 23r, a front sprocket group 24f, a rear sprocket group 24r, and other components.

The front derailleur 23f is an electrically controllable electric derailleur for guiding the chain 21 to any of a plurality (e.g. two) of shift positions. The front derailleur 23f is mounted to the seat tube 13 of the frame 1.

Figure 2:
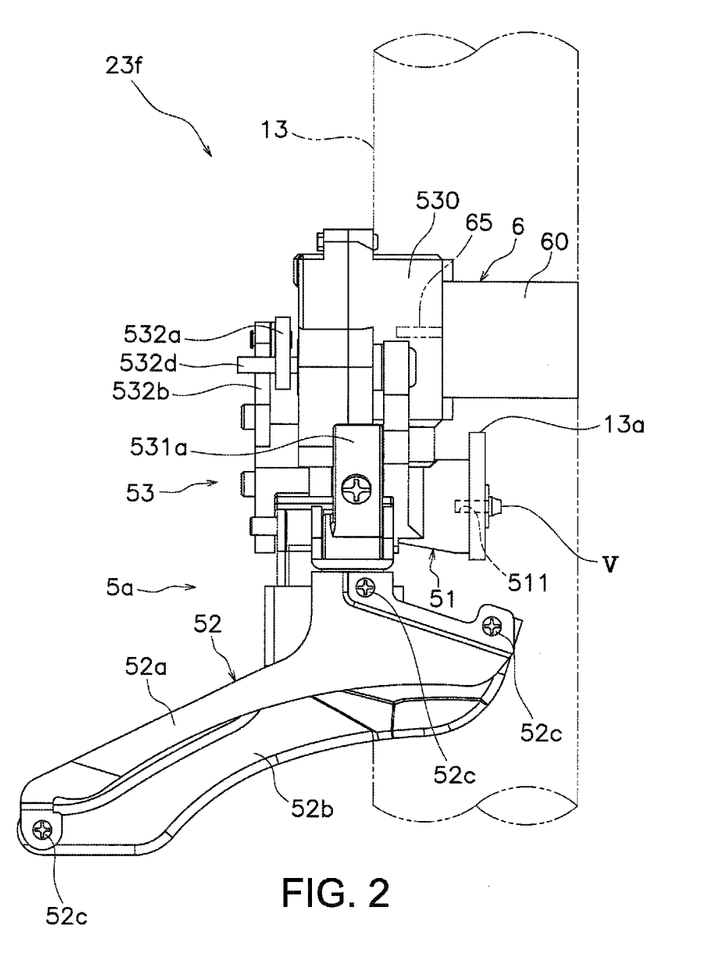
FIG. 2 is a side elevational view of the front derailleur.
Figure 3:
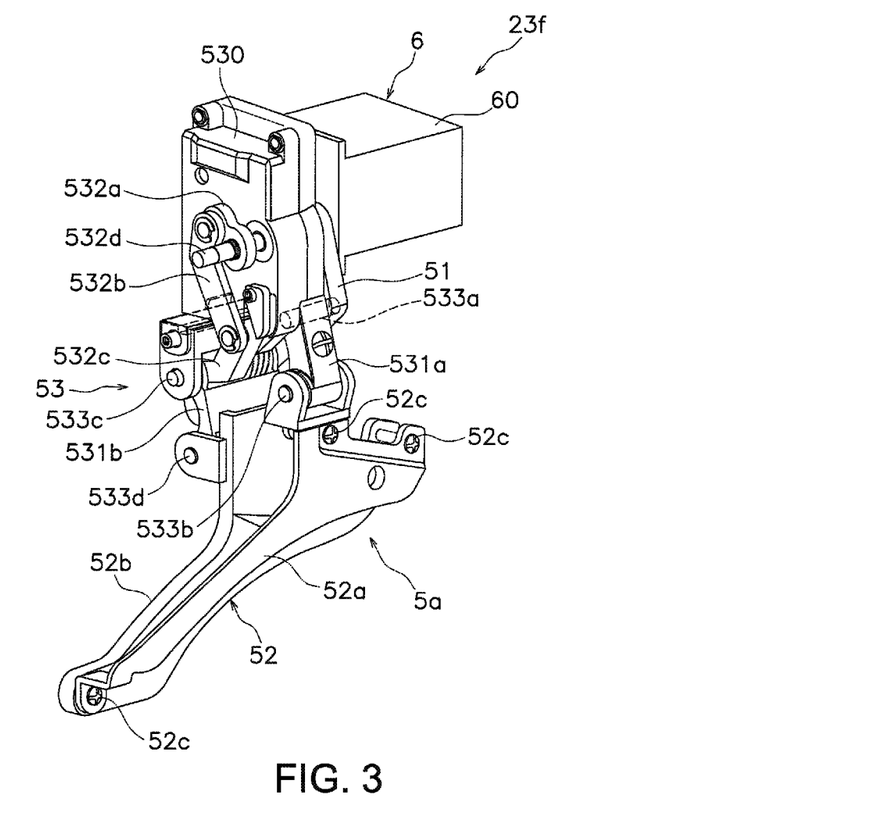
FIG. 3 is a perspective view of the front derailleur.

The front derailleur 23f comprises a first chain guide unit 5a and a motor unit 6, as shown in FIGS. 2 and 3.

The first chain guide unit 5a comprises a fixing member 51, a chain guide 52, and a support mechanism 53. The fixing member 51 is a member fixed to the frame 1 of the bicycle 10. Specifically, the frame 1 further has an attachment base (an example of a fixed member) 13a fixed to the seat tube 13 by welding or the like. The attachment base 13a, which is formed so as to protrude from the seat tube 13, has a through-hole for bearing a fixing bolt V, which is an example of a fastening member. The fixing member 51 has a screw hole 511 into which the fixing bolt V is threaded. By passing the fixing bolt V through the through-hole of the attachment base 13a and threading the fixing bolt V into the screw hole 511 of the fixing member 51, the fixing member 51 is fixed to the attachment base 13a.

The chain guide 52 is a member for guiding the chain 21, and is preferably configured from a hard, rigid material. For example, the chain guide 52 is configured from a metal material such as sheet metal bent into the desired shape. Specifically, the chain guide 52 has an outer guide plate 52a, an inner guide plate 52b, and a plurality of screw members 52c. The outer guide plate 52a and the inner guide plate 52b are linked at predetermined intervals by the plurality of screw members 52c. The chain 21 can thereby be inserted between the outer guide plate 52a and the inner guide plate 52b.

The support mechanism 53 is a mechanism for supporting the chain guide 52 so as to enable the chain guide 52 to move relative to the fixing member 51. Specifically, the support mechanism 53 has a first link member 531a and a second link member 531b as shown in FIG. 3. The first link member 531a and the second link member 531b are linked to be capable of pivoting about a first shaft relative to the fixing member 51, and are also linked to be capable of pivoting about a second shaft relative to the chain guide 52. More specifically, the first link member 531a is linked at a first end to the fixing member 51 via a pivot pin 533a which is one example of the first shaft, and is linked at a second end to the chain guide 52 via a pivot pin 533b which is one example of the second shaft. The second link member 531b is linked at a first end to the fixing member 51 via a pivot pin 533c which is one example of the first shaft, and is linked at a second end to the chain guide 52 via a pivot pin 533d which is one example of the second shaft. In this first chain guide unit 5a, a four-link mechanism is configured by the first link member 531a, the second link member 531b, part of the chain guide 52, and part of the fixing member 51. The pivot pins 533a to 533d described above extend parallel to each other.

When the chain guide 52 is held in the position where the above-described support mechanism 53 is most extended, the chain guide 52 is positioned on the outermost sprocket; i.e., the sprocket that is furthest from the seat tube 13. When the chain guide 52 is held in the position where the support mechanism 53 is most contracted, the chain guide 52 is positioned on the innermost sprocket, i.e. the sprocket nearest to the seat tube 13. The support mechanism 53 extends and contracts along with the driving of the motor unit 6 and causes the chain guide 52 to move.

The support mechanism 53 further has a motor link 532a, a first auxiliary link 532b, a second auxiliary link 532c, a rotating shaft 532d, and a housing 530. The rotating shaft 532d extends from the interior of the housing 530 to the exterior, and the rotating shaft 532d is rotatably driven by the motor unit 6 as described hereinafter.

The motor link 532a is non-rotatably fixed to the rotating shaft 532d. Specifically, the rotating shaft 532d is engaged with a first end of the motor link 532a. The first auxiliary link 532b is pivotally linked to the motor link 532a and pivotally linked to the second auxiliary link 532c. Specifically, the first auxiliary link 532b is linked at a first end to the second end of the motor link 532a by a pivot pin, and is linked at a second end to the first end of the second auxiliary link 532c by a pivot pin. The second auxiliary link 532c is pivotally linked to the first auxiliary link 532b, and pivotally linked to the second link member 531b. Specifically, the second end of the second auxiliary link 532c is also linked to the pivot pin 533c which links the second link member 531b and the fixing member 51.

Figure 4:
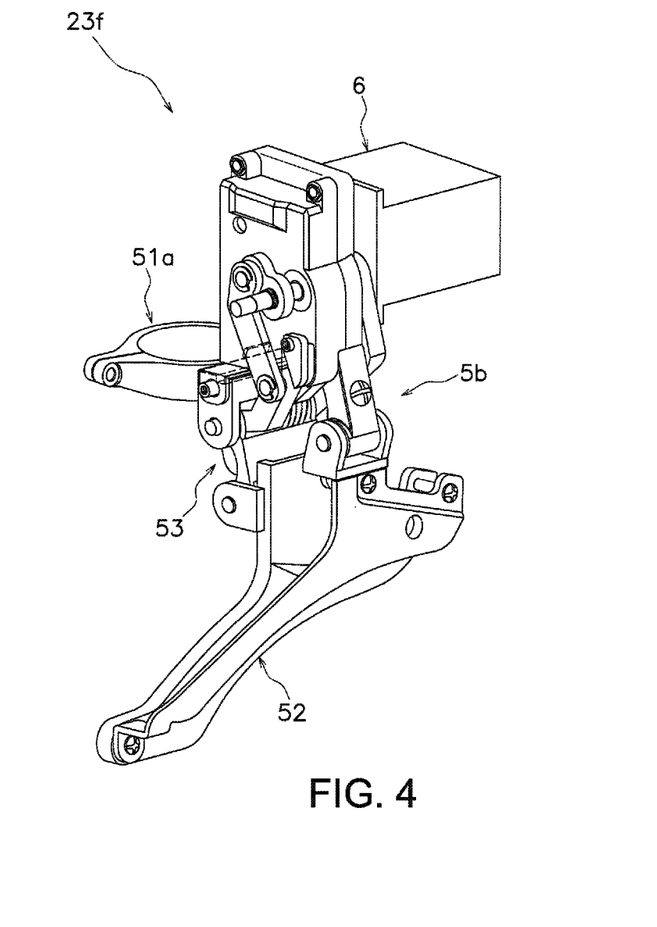
FIG. 4 is a perspective view of a front derailleur having a second chain guide unit.

The first chain guide unit 5a configured as described above is a direct-mounted chain guide unit, and is selected from plurality of configurations of chain guide units. In the front derailleur 23f, the first chain guide unit 5a can be replaced with another type of chain guide unit. For example, instead of the above-described direct-mounted first chain guide unit 5a, a band-type second chain guide unit 5b such as the one shown in FIG. 4 can be used. In this band-type second chain guide unit 5b, a fixing member 51a has an annular band member. The fixing member 51a uses a fixing bolt or the like to sandwich (clamp) the seat tube 13, whereby the fixing member 51 is mounted on the seat tube 13. Except for the fixing member 51a having an annular band member, the second chain guide unit 5b has the same basic configuration as the first chain guide unit 5a. In the first chain guide unit 5a and the second chain guide unit 5b, the same symbols are used to denote components that are configured substantially identically, and redundant descriptions of such components are omitted. The same applies to the third through sixth chain guide units 5c to 5f described below.

Figure 5:
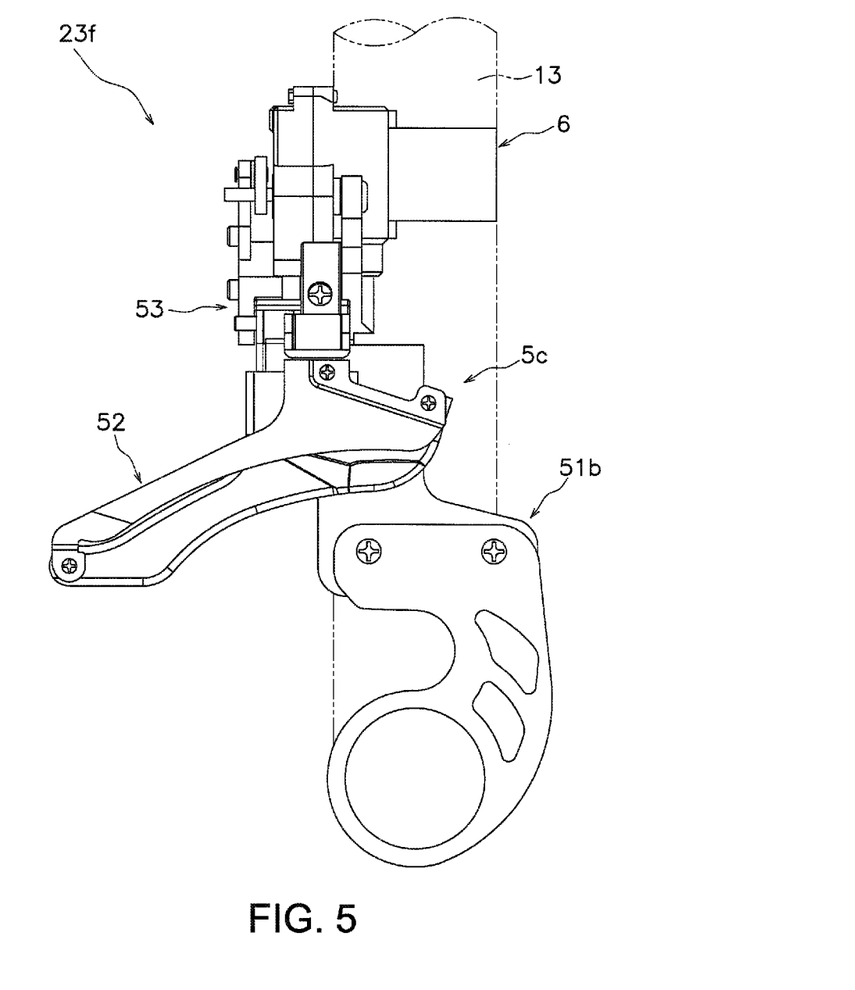
FIG. 5 is a side elevational view of a front derailleur having a third chain guide unit.

Instead of the direct-mounted first chain guide unit 5a, a third chain guide unit 5c such as the one shown in FIG. 5, which is a type mounted on a bottom bracket, can also be used. In this third chain guide unit 5c, a fixing member 51b has a plate member fixed to the bottom bracket of the frame of the bicycle. Except for the fixing member 51b having a plate member, the third chain guide unit 5c has the same basic configuration as the first chain guide unit 5a.

Figure 6:
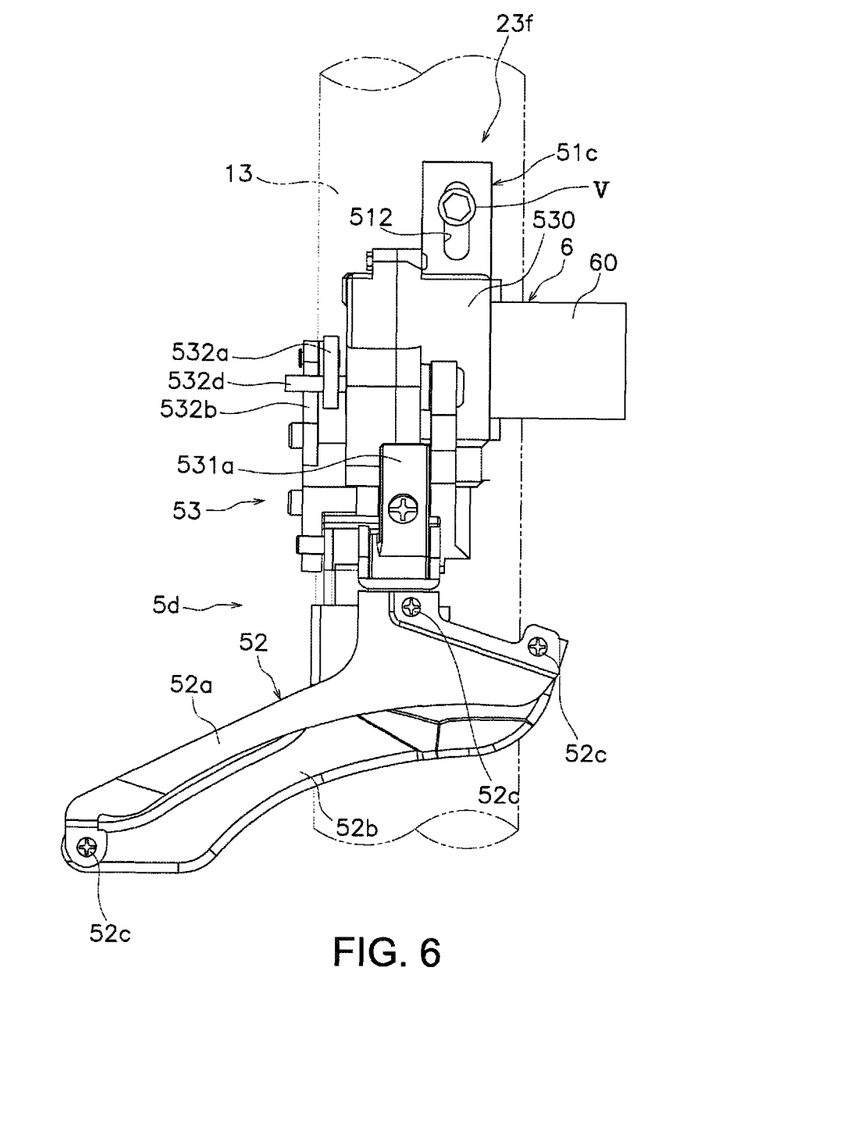
FIG. 6 is a side elevational view of a front derailleur having a fourth chain guide unit.

Instead of the first chain guide unit 5a, a fourth chain guide unit 5d such as the one shown in FIG. 6 can also be used. This fourth chain guide unit 5d, unlike the first chain guide unit 5a, has a fixing member 51c formed into a plate shape. The fixing member 5ic has a through-hole 512 through which a bolt V is passed. The through-hole 512 preferably has an elongated shape extending vertically in a state of the front derailleur 23f attached to the seat tube 13, so that the vertical attachment position of the front derailleur 23f can be adjusted. Formed in the seat tube 13 is a screw hole into which the bolt V passed through the through-hole 512 is threaded. In this fourth chain guide unit 5d, the fixing member 51c is fixed to the seat tube 13 by passing the bolt V through the through-hole 512 and threading the bolt in the screw hole of the seat tube 13. Except for the configuration of the fixing member 51c, the fourth chain guide unit 5d has the same basic configuration as the first chain guide unit 5a.

Figure 7:
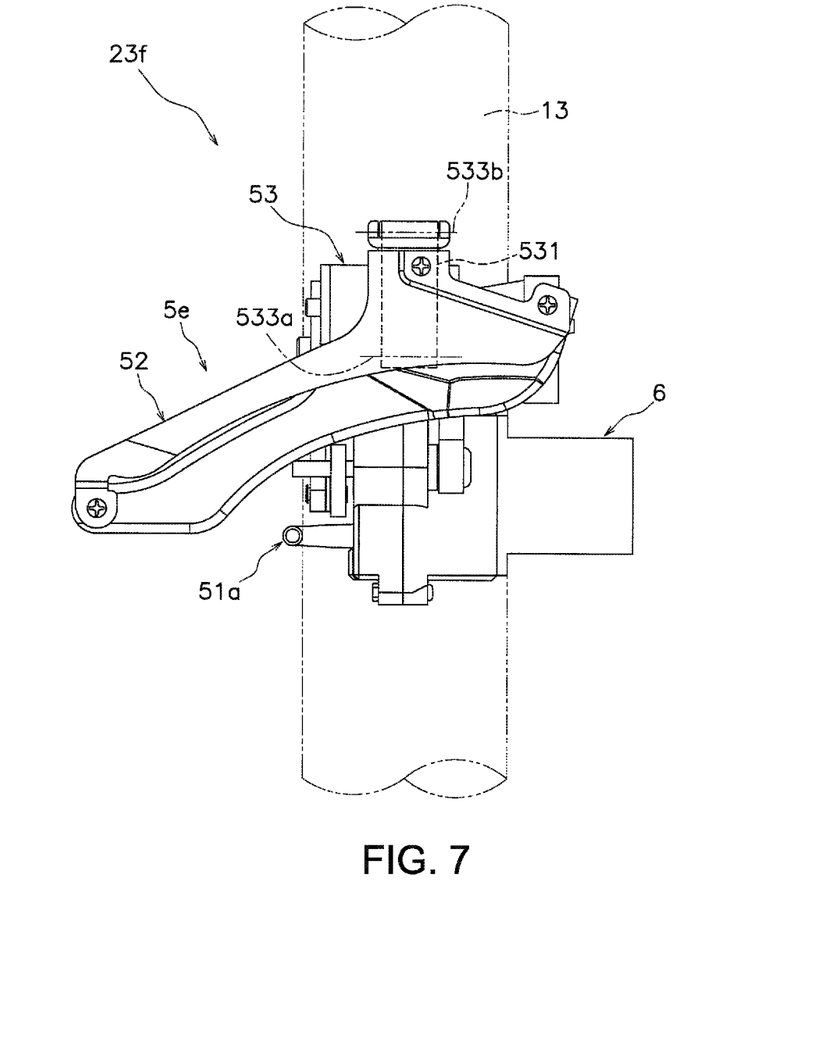
FIG. 7 is a side elevational view of a front derailleur having a fifth chain guide unit.

The above-described first through fourth chain guide units 5a to 5d are types or configurations in which the rotating shaft (first shaft) of the fixing member and link member is disposed higher than the rotating shaft (second shaft) of the link member and chain guide in a state of the front derailleur 23f attached to the frame 1, but the chain guide unit is not limited as such. A chain guide unit in which the second shaft is disposed higher than the first shaft can also be used. Specifically, in a fifth chain guide unit 5e shown in FIG. 7, the first shaft 533a is disposed below the second shaft 533b in a link member 531. The fifth chain guide unit 5e has a band (clamp) type fixing member 51a, similar to the second chain guide unit 5b.

The motor unit 6 is a drive source for driving the support mechanism 53 and causing the chain guide 52 to move. The motor unit 6 is removably attached to various chain guide unit. Specifically, the motor unit 6 is removably attached to the above-described first through fifth chain guide units 5a to 5e. For example, the motor unit 6 is attached to the first through fifth chain guide units 5a to 5e using fixing bolts or the like. The motor unit 6 drives the support mechanism 53 so that the support mechanism 53 undergoes an extending and contracting action in a state of the motor unit 6 attached to any of the chain guide units.

Specifically, in the motor unit 6, an output shaft 65 from a housing 60, the output shaft 65 being rotated by a motor 61 (see FIG. 8) inside the housing 60. To describe the chain guide unit in the case of the first chain guide unit 5a such as is shown in FIGS. 2 and 3, the motor unit 6 is attached to the housing 530 of the support mechanism 53. When the motor unit 6 is attached to the housing 530 in this manner, the output shaft 65 (see FIG. 2) of the motor unit 6 is inserted into an attachment part of the housing 530 of the support mechanism 53. The output shaft 65 of the motor unit 6 inserted into the attachment part of the housing 530 links with the rotating shaft 532d via a gear or the like inside the housing 530, and causes the rotating shaft 532d to rotate.

When the chain guide unit is one of the other second through fifth chain guide units 5b to 5e, the motor unit 6 is similarly attached to the housing 530 of the support mechanism 53 of the chain guide unit. When the motor unit 6 is thus attached to the housing 530, the output shaft 65 of the motor unit 6 is inserted into the housing 530 of the support mechanism 53 and linked so as to cause the rotating shaft 532d to rotate.

FIG. 8 is a block diagram showing the motor unit 6 and the instruments connected to the motor unit 6. The motor unit 6 has a motor 61, a motor drive part 62, a front shift controller 63 (an FD controller) for controlling the motor drive part 62, a position sensor 64, and a housing 60 for accommodating these components in the interior, as shown in FIG. 8.

The motor drive part 62 is a unit that includes a motor driver and a decelerating unit for decelerating the rotation of the motor 61. The shift controller 63 has a control circuit including a microcomputer, and controls the motor drive part 62 in accordance with a shift signal outputted from the shifting operation part 127r by software. The position sensor 64 is a sensor for detecting the shift position of the front derailleur 23f.

Power from a power source device 7 mounted on the front derailleur 23f is supplied to the front derailleur 23f, the shifting operation part 127r, and the display device 124. Specifically, the motor unit 6 of the front derailleur 23f is supplied with power having a DC power source voltage Vcc of about 6 to 8.4 volts, for example, from the power source device 7 via a power source line 150 and a ground line 151. The power of the power source voltage Vcc is supplied to the display device 124 and the shifting operation part 127r from the motor unit 6 via a power source line 152 and a ground line 153. A shift position signal POS of the position sensor 64 is outputted to the display device 124 via a position signal line 154, and the shift position of the front derailleur 23f is disposed on the display device 124. A shift signal FDS outputted according to the operation of the shifting operation part 127r is outputted to the front derailleur 23f via a shift signal line 155.

Modifications

Embodiments of the present invention were described above, but the present invention is not limited to these embodiments, and various modifications can be made as long as they do not deviate from the scope of the present invention.

Modification 1

In the above embodiments, the types configurations of front derailleur shown in FIGS. 2 through 7 were exemplified as the plurality of configurations of front derailleurs, but the present invention is not particularly limited to these configurations of front derailleurs, and other configurations of front derailleurs may be used.

Modification 2

The rotating shaft 532d may be the output shaft of the motor unit 6. Specifically, the configuration may be such that when the motor unit 6 is attached to the chain guide units 5a to 5d, the rotating shaft 532d, which is the output shaft of the motor unit 6, is engaged with to the motor link 532a.

Modification 3

Figure 9:
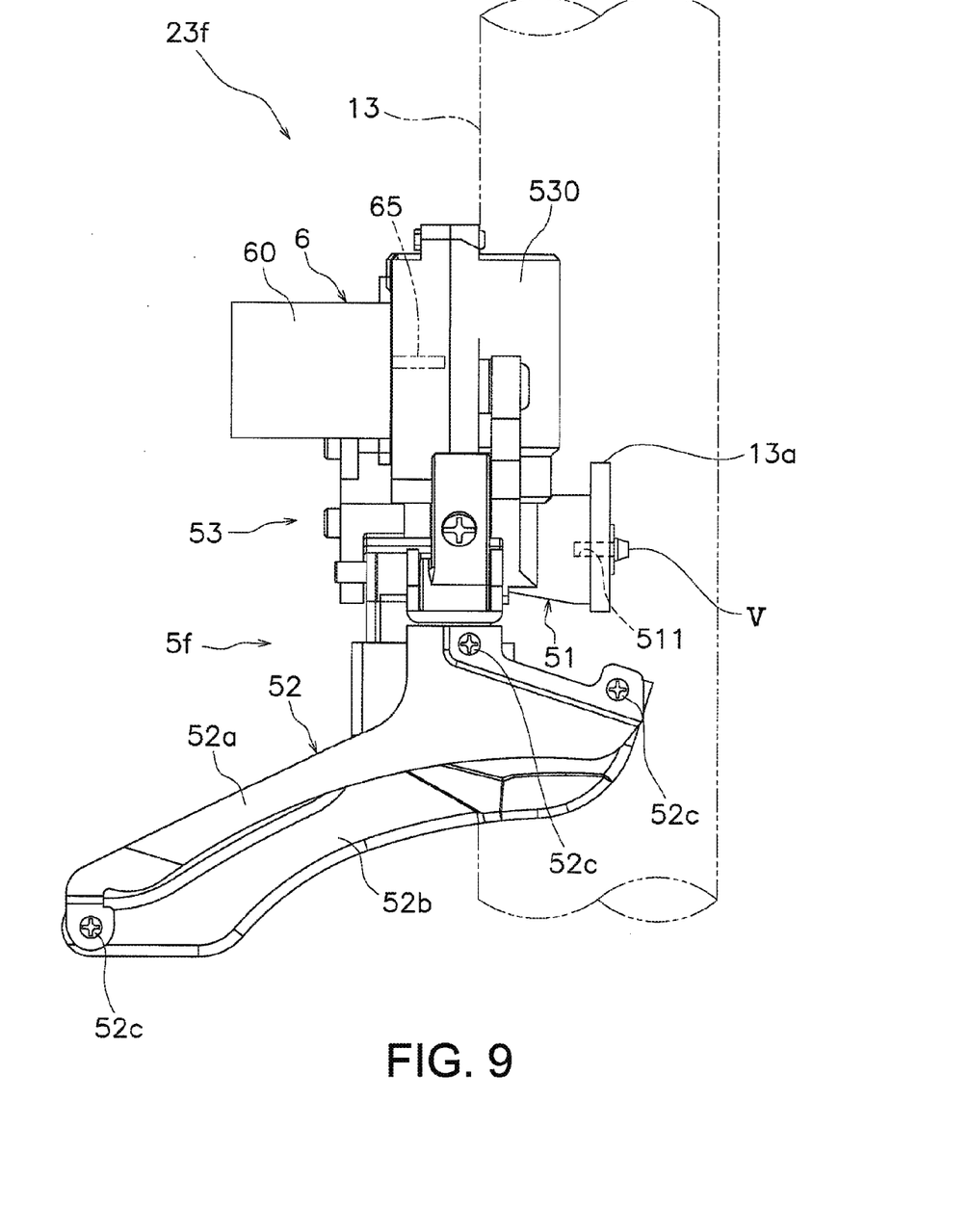
FIG. 9 is a side elevational view of a front derailleur having a fifth chain guide unit.

In the above embodiments, the output shaft 65 of the motor unit 6 is oriented facing from the front toward the back, but is not particularly limited as such. For example, the configuration can be such that a sixth chain guide unit 5f has an attachment part for the motor unit 6 on the rear surface, and the motor unit 6 is attached to the sixth chain guide unit 5f from the rear, as shown in FIG. 9. In this case, the output shaft 65 of the motor unit 6 is oriented facing from the back towards the front.

Modification 4

In the above embodiments, the first through sixth chain guide units 5a to 5f are configured including fixing members, but are not particularly limited as such. For example, the fixing members may be provided to the motor unit.

Furthermore, the foregoing descriptions of the embodiments according to the present invention are provided for illustration only, and not for the purpose of limiting the invention as defined by the appended claims and their equivalents.

What is claimed is:

1. A bicycle derailleur comprising:
a fixing member configured to be fixed to a bicycle frame;
a selected chain guide unit having a chain guide for guiding a bicycle chain and a support mechanism moveably supporting the chain guide relative to the fixing member, the fixing member being connected to the support mechanism, the support mechanism including a housing and a rotating shaft extending from the housing, the selected chain guide unit being one of a plurality of different configurations of chain guide units, each of the chain guide units having the support mechanism, the support mechanism including a first link member linked to the fixing member to pivot about a first shaft and a second member linked to the chain guide to pivot about a second shaft,
the support mechanism being in a first orientation with the first and second link members linking the chain guide to the support mechanism such that the second shaft is disposed at a position that is lower than the first shaft while the derailleur is attached to the bicycle frame to establish a first chain guide configuration,
the support mechanism being inverted and being in a second orientation with the first and second link members linking the chain guide to the support mechanism such that the second shaft is disposed higher than the first shaft while the derailleur is attached to the bicycle frame to establish a second chain guide configuration; and
a motor unit configured to be selectively attached to the selected chain guide unit to move the chain guide, the motor unit being configured to be mounted to each of the plurality of configurations of chain guide units, the motor unit including an output shaft configured to operatively engage with the support mechanism to rotate the rotating shaft when the motor unit is attached to the selected chain guide unit.

2. The derailleur according to claim 1, wherein the fixing member includes an annular band part for tightening the bicycle frame.

3. The derailleur according to claim 1, wherein the fixing member has a through-hole for receiving a bolt therethrough to fix the fixing member to the bicycle frame.

4. The derailleur according to claim 3, wherein the through-hole is an elongated hole.

5. The derailleur according to claim 1, wherein the fixing member includes a plate part that is configured to be fixed to a bottom bracket of the bicycle frame.

6. The derailleur according to claim 1, wherein the fixing member has a screw hole for threadedly engaging a bolt that extends through a through-hole in fixed part of the bicycle frame.

7. The derailleur according to claim 1, wherein the output shaft has an orientation while the derailleur is attached to the bicycle frame in an installed state corresponding to the first chain guide configuration that is different while the derailleur is attached to the bicycle frame in an installed state corresponding to the second chain guide configuration.

* * * * *